Patented Sept. 27, 1932

1,879,272

UNITED STATES PATENT OFFICE

EDWIN A. INKLEY, OF LYNDHURST, OHIO, ASSIGNOR TO FOUNDRY MATERIALS, INC., OF LYNDHURST, OHIO, A CORPORATION OF OHIO

SAND PREPARATION

No Drawing.   Application filed February 21, 1931.   Serial No. 517,636.

This invention relates to the metal molding art and more particularly to sand preparations for use in the manufacture of steel castings.

Because of the high temperature at which steel castings are poured, and because of the destructive washing action of the molten steel on the ordinary green sand mold, high quality steel castings are ordinarily made in dry or baked sand molds. Such molds are formed in the usual way and then baked for several hours at a fairly high temperature, in order to harden and dry them. The baking and the handling incident to the baking of the molds add greatly to their cost.

In addition to being firm enough to withstand the washing action of the molten steel, a good sand mold must be sufficiently porous to allow the escape of gases. It must be refractory to prevent the destruction of the surface of the mold by the extremely high temperatures of the steel, and when low carbon alloy steels are being cast, the molding sand should contain no carbon, for the carbon of the mold will combine with the metal. Heretofore, it has been impossible to obtain all of the above desired qualities only in baked dry sand molds.

Accordingly, the general object of my invention is to provide a self-hardening molding sand, suitable for use in preparing steel castings. Another object is to provide a method of preparing such a sand. Another object is to provide a sand which will require no baking and which will provide a mold with a smooth, strong surface and of sufficient porosity to allow for the escape of gas, thereby preventing the formation of blow holes. Another object of my invention is to provide such a sand embodying no carbonaceous material. A further object of my invention is to provide a self-hardening, plastic, refractory material adapted for use in furnace linings.

I have found that the desired results can be obtained by adding to an ordinary high-grade silica sand a small percentage of a mixture of colloidal clay, such as Bentonite, and a solution of water glass or sodium silicate. When mixed with the sand in proper proportions, the clay and water glass produce a mold with sufficient strength and with a fine, smooth surface, and yet the porosity of the mold is not impaired and castings free from blow holes and with smooth surfaces may be formed in such molds.

It has previously been proposed to employ colloidal clay as a bond in conjunction with molding sand, but it has been found that green sand molds formed from such a mixture are limited to comparatively small castings, due to the fact that the sand mixture is not strong enough to withstand the wash of metal and due to the fact that comparatively large amounts of moisture in large green sand molds cause blow holes. To eliminate this trouble, it has been necessary to employ the expensive baking process to create a hard surface not as susceptible to washing and to eliminate blow holes caused by steam generated in the green sand mold. Attempts have also been made to employ sodium silicate in the molding art. However, this has largely been in an effort to provide a refractory coating for permanent metal molds. A difficulty in the use of sodium silicate alone is due to the fact that sodium silicate fuses at about 1860° F., whereas steel castings are frequently poured at temperatures of around 2800° F., resulting in destruction of parts of the mold.

Apparently, in my molding sand the sodium silicate and the Bentonite both act as binders to hold the sand particles together in the mold, and the two substances supplement each other's action in such a manner that the percentage of clay and sodium silicate may be small and thus the porosity and refractory qualities of the sand mold are not impaired. I do not understand the precise action, but it is possible that the colloidal particles of clay serve to break up the glassy film which would otherwise result from the drying of the water glass, or perhaps that the sodium silicate has some action which tends to precipitate the colloidal clay particles. In any event, a strong mold is formed which is not washed away by the molten steel, and the molds are sufficiently porous and refractory to produce high-grade steel castings.

The molds may be formed in the usual way with the entire flask filled with my molding sand, or if desired, my special molding sand may be used as a facing and the remainder of the flask filled with ordinary silica sand. Regardless of which method is employed, it is only necessary to allow the mold to stand for a few hours after the pattern has been withdrawn to produce a sufficiently dry, hard mold, with every advantage of the usual dry sand mold, made by the baking process.

In preparing my molding sand, I prefer to mix seven parts by volume of 40 degrees Baumé solution of sodium silicate with one part by volume of water. To the mixture is added 3½% by weight of a colloidal clay, such as Bentonite. This mixture is then mixed with the usual molding sand in the proportions of one part by volume of the sodium silicate and colloidal clay mixture to eighteen parts of sand. After mixing as above, it may be necessary to temper the sand to the desired consistency by the addition of water, depending upon the moisture content of the sand.

The proportions by weight in the colloidal clay and sodium silicate mixture may be substantially as follows: From 80% to 90% of 40 degree Baumé solution of sodium silicate, from 2 to 7% by weight of Bentonite and from 3 to 18% of water. Any mixture approximating the above percentages will give satisfactory results when one part of the mixture is mixed with from 10 to 25 parts of ordinary molding sand. However, I have found that the best results are obtained when the mixture is made as first outlined above.

It will be found that a molding sand, made according to my invention, may be easily handled and readily rammed up around a pattern and a mold made with my sand will have a strong, hard and smooth surface after it has been allowed to remain exposed to the air for a short period of time, and will produce high-grade steel castings free from blow-holes. Also, as my molding sand contains no carbonaceous material, the carbon content of the steel will not be increased.

Obviously, my sand preparation may be used for other purposes than in the manufacture of castings, and is adaptable for use wherever a plastic refractory material is required, such as in repairing the linings of open hearth furnaces, etc.

I claim:

1. A self-hardening sand preparation, comprising a mixture of from 90% to 97% of ordinary molding sand, and 3% to 10% of a mixture comprising from 80% to 90% of 40 degree Baumé solution of sodium silicate, from 2% to 7% of a colloidal clay and from 3% to 18% of water.

2. A molding sand, formed by mixing 7 parts by volume of sodium silicate with one part by volume of water, then mixing this sodium silicate solution with about 3½% of its weight of colloidal clay, and then mixing one part of the sodium silicate and colloidal clay solution with eighteen parts of ordinary molding sand.

3. A self-hardening molding sand, comprising ordinary molding sand, sodium silicate solution, and a colloidal clay, the combined weights of the sodium silicate solution and colloidal clay forming less than ten percent of the entire mixture.

4. A binder for molding sand comprising 80 to 90 parts of 40° Baumé solution of sodium silicate, 2 to 7 parts of colloidal clay and a small amount of water.

In testimony whereof, I hereunto affix my signature.

EDWIN A. INKLEY.